United States Patent [19]

Chen et al.

[11] Patent Number: 5,784,463
[45] Date of Patent: Jul. 21, 1998

[54] TOKEN DISTRIBUTION, REGISTRATION, AND DYNAMIC CONFIGURATION OF USER ENTITLEMENT FOR AN APPLICATION LEVEL SECURITY SYSTEM AND METHOD

[75] Inventors: James F. Chen; Jieh-Shan Wang, both of Potomac, Md.

[73] Assignee: V-ONE Corporation, Germantown, Md.

[21] Appl. No.: 760,414

[22] Filed: Dec. 4, 1996

[51] Int. Cl.$^6$ .............................. H04L 9/08; H04L 9/30; H04L 9/32; H04L 9/00
[52] U.S. Cl. .............................. 380/21; 380/9; 380/23; 380/25; 380/30; 380/49; 380/50
[58] Field of Search .............................. 380/4, 9, 21, 23, 380/24, 25, 30, 44, 45, 46, 47, 49, 50, 59

[56] References Cited

U.S. PATENT DOCUMENTS

| | | |
|---|---|---|
| 5,226,079 | 7/1993 | Holloway .............................. 380/25 |
| 5,373,559 | 12/1994 | Kaufman et al. .............................. 380/303 |
| 5,491,752 | 2/1996 | Kaufman et al. .............................. 380/30 |
| 5,717,756 | 2/1998 | Coleman .............................. 380/25 |

Primary Examiner—Bernarr E. Gregory
Attorney, Agent, or Firm—Bacon & Thomas

[57] ABSTRACT

A shared secret key distribution system which enables secure on-line registration for services provided by an application server through an application level security system or firewall utilizes an authentication token containing a server public key. The server public key is used to encrypt a client-generated portion of the shared secret key, and the encrypted client-generated key is sent to the server where it is recovered using a private key held by the server and combined with a server generated portion of the shared secret key to form the shared secret key. The server generated portion of the shared secret key is then encrypted by the client-generated portion of the shared secret key and transmitted to the client for recovery and combination with the client-generated portion of the shared secret key, at which time both the client and server are in possession of the shared secret key, which can then be used for mutual authentication and development of session keys to secure subsequent communications. The session keys can be used to provide dynamic configuration of a client system to provide for different or changing user entitlements.

26 Claims, 6 Drawing Sheets

5,784,463

1

TOKEN DISTRIBUTION, REGISTRATION, AND DYNAMIC CONFIGURATION OF USER ENTITLEMENT FOR AN APPLICATION LEVEL SECURITY SYSTEM AND METHOD

BACKGROUND OF THE INVENTION

1. Field of the Invention

This invention relates to a system and method for securing a computer system from unauthorized access over an open or public network to which the computer is connected, and in particular to a system and method of token distribution, registration, and configuration for use in connection with such a security system.

2. Description of Related Art

Copending U.S. patent application Ser. No. 08/593,240, filed Dec. 22, 1995, now U.S. Pat. No. 5,602,918, describes an application level security system for securing communications between a server and client computers connected to an open or public network by providing for mutual authentication of the parties to a communication and generation of a session key for encrypting further communications without the need for intervention of a certification authority during the communications session.

In the system described in the copending patent application, mutual authentication is established using a dual challenge/response technique whereby one computer sends an unpredictable challenge to the other and the responses are encrypted using a shared secret key, the exchange of encrypted responses being used at the same time to develop the session key for securing further communications during the session.

Typically, one of the computers party to the communication is an authentication server which provides a gateway from the open network to secured applications servers offering services or products for sale to client computers on the open network, with access to the authentication server from the client side being gained through the use of authentication tokens in which are seeded the shared secret keys corresponding to those held by the authentication server.

To secure the shared secret keys and yet enable widespread distribution and portability, the authentication tokens are advantageously in the form of limited access smartcards or PCMCIA cards, although the tokens can also be in the form of software packages. In either case, to ensure key integrity, the tokens are pre-seeded or initialized with the shared secret or authentication keys before distribution to the public.

This type of controlled access system is commonly referred to as a firewall, although the purpose of the system is not only to prevent access to the server by unauthorized parties on the open network, but also to provide potential clients or customers with the confidence to carry out transactions over the network by offering secured access and privacy to every potential client or customer of the services and products provided. As a result, the system is designed to be application independent, i.e., compatible with a wide range of application servers and client computer systems.

The present invention is specifically directed to furthering this purpose of providing secured access to the widest range of potential clients or customers for products and services offered by application servers on the system, by addressing problems of key seeding, token distribution, and user entitlement.

Currently, in order to obtain a token for an application, the potential client must pre-purchase or specifically request a token which has been pre-seeded with keys for the particular application, or for a limited range of applications offered through those authentication servers that possess or have access to keys corresponding to the authentication keys seeded onto the token, or the pre-seeded tokens must be indiscriminately distributed to potential customers through unsecured channels. This not only inconveniences the potential client, which is a significant disadvantage given that the fundamental reason for existence of an open network such as the Internet is convenience, i.e., the ability for a consumer to simply browse the network and obtain immediate access to a wide variety of service providers on the network, but also requires the authentication server to maintain a database of all distributed shared secret keys, and increases the likelihood that some of the shared secret keys will be compromised.

In addition, the current system does not provide for changes in the location and entitlement of the holders. In order to change entitlements involving configuration of the user's system, it is necessary to provide pre-seeded tokens with keys for each level or type of entitlement. Again, this limits the number of potential clients and the convenience of carrying out commerce over the open network using above type of gateway, no matter how secure.

SUMMARY OF THE INVENTION

It is accordingly a first objective of the invention to provide an improved system and method of token distribution and a registration for use in connection with a shared secret key application level security system in which the authentication token does not need to be preseeded with the shared secret authentication keys, and which therefore gives the user greater flexibility in selecting gateways and applications with which the token is to be used.

It is also an objective of the invention to provide an improved system and method of configuring user entitlements for use in connection with a shared secret key application level security system which enables a user with a valid token to be able to communicate securely from any location and from a variety of systems while allowing dynamic change of system configuration based on user entitlements.

It is yet another objective of the invention to provide an improved application level security system and method which offers secure on-line distribution of shared secret keys at the time of registration and also dynamic configuration of user entitlements, and which utilizes the shared secret keys to provide mutual authentication and generation of session keys to secure subsequent communications between holders of the shared secret keys.

In its broadest form, the invention achieves its objectives by generating a shared secret key at the time of registration, the shared secret key being based on a public/private key cryptosystem, the private key for which is held by the server. According to the invention, therefore, the shared secret key does not exist before registration, and the authentication token can be used by the client to register for any application offered by servers in possession of the private key. Each client of the server possesses a different shared secret key, and yet the server need only store the private key and shared secret keys of registered clients.

In an especially advantageous embodiment of the broadest concept of the invention, i.e., the generation of a shared secret key at the time of registration based on a server public key, the server public key used to generate the shared secret key is itself distributed at the time of registration, and is signed by a private key held by a certification authority or token issuer, the public key for which is included in the token, thereby enabling authentication of the server public key by the registrant.

As a result of the preferred secured on-line registration and secret key distribution, the authentication tokens may be used for different purposes at different locations on a variety of systems. To take advantage of this capability, the present invention offers configuration of the user's system during the registration process or upon request following a change in user location or in the user's system based on previously established user entitlements.

In a specific implementation of the preferred embodiment of the invention, the portion of the shared secret key generated by the user is sent back to the server using the server public key to encrypt the shared secret key portion, with the server then extracting and authenticating the user-generated shared secret key portion based on the server private key, after which a second portion of the shared secret key is generated by the server and sent back to the user using the user generated portion of the shared secret key as the encryption key to thereby authenticate the server and complete distribution/generation of the shared secret key for use in securing subsequent sessions, for use in enabling dynamic configuration of a client system in response to changing user entitlements, and for use in the development of session keys during the subsequent sessions by means, for example, of the method and system described in copending application Ser. No. 08/593,240.

Furthermore, in an especially advantageous aspect of the invention, the server public key is itself distributed to the user in a secure manner, by transmitting it to the user at the time of registration in the form of a certificate signed by the token issuer or a certification authority and verifiable by a public key embedded in the token prior to distribution. Since the certificate is signed using a private key known only to the token issuer or token certifier, the client software can ensure that the server public key has been authorized by the token issuer or certifier.

Thereafter, according to the invention, anyone holding a token can register to conduct transactions via the server by generating a number as the shared secret key, encrypting the number using the server public key, and using the shared secret key to generate session keys, thus providing a secure yet economical key distribution system.

DETAILED DESCRIPTION OF THE PREFERRED EMBODIMENTS

Figure 1A:
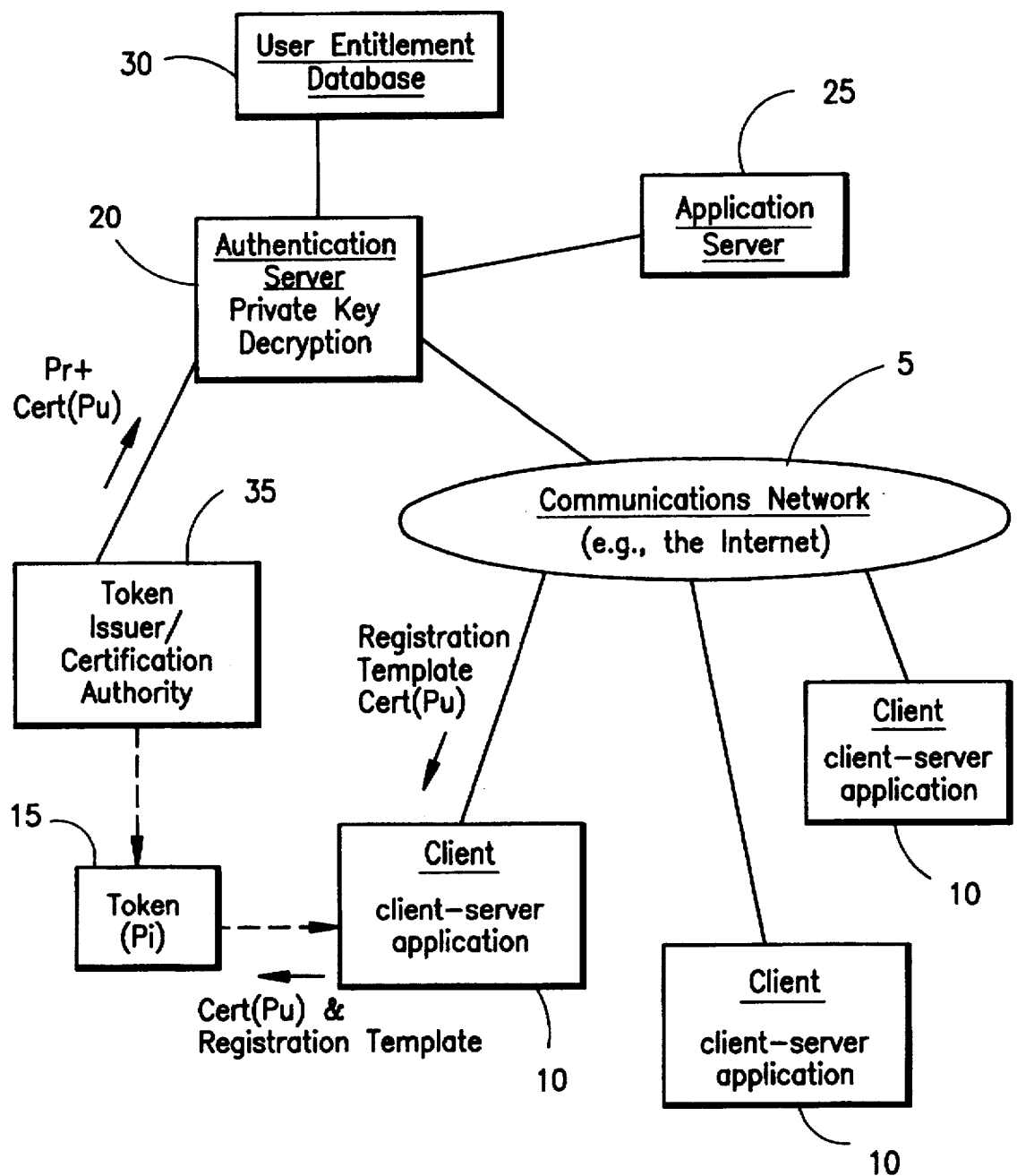
FIG. 1A is a functional block diagram of a system constructed in accordance with the principles of a preferred embodiment of the invention and showing aspects of a preferred key distribution and registration procedure.
Figure 1B:
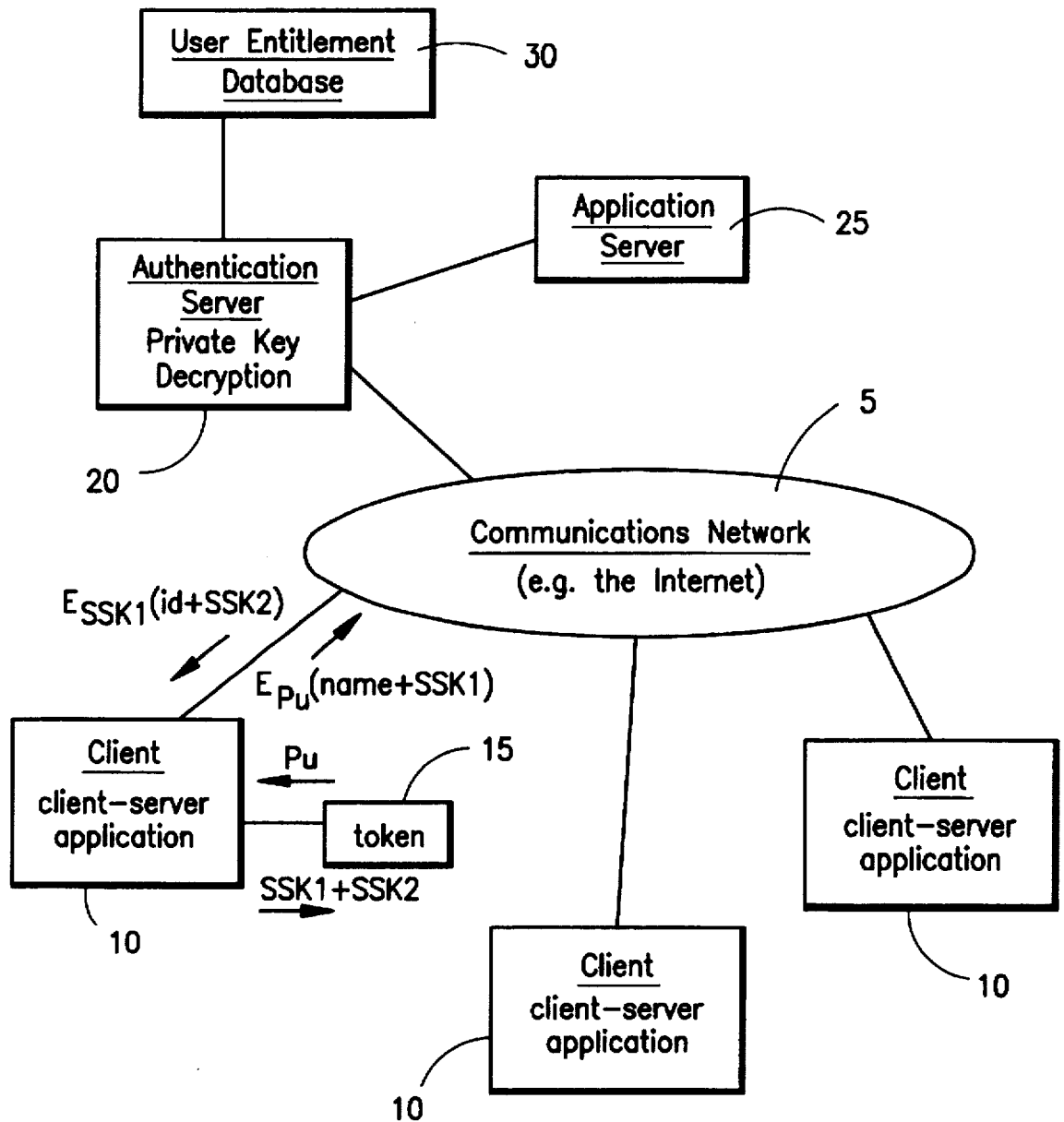
FIG. 1B is a functional block diagram of the preferred system showing further aspects of the preferred registration and key distribution procedure.
Figure 2:
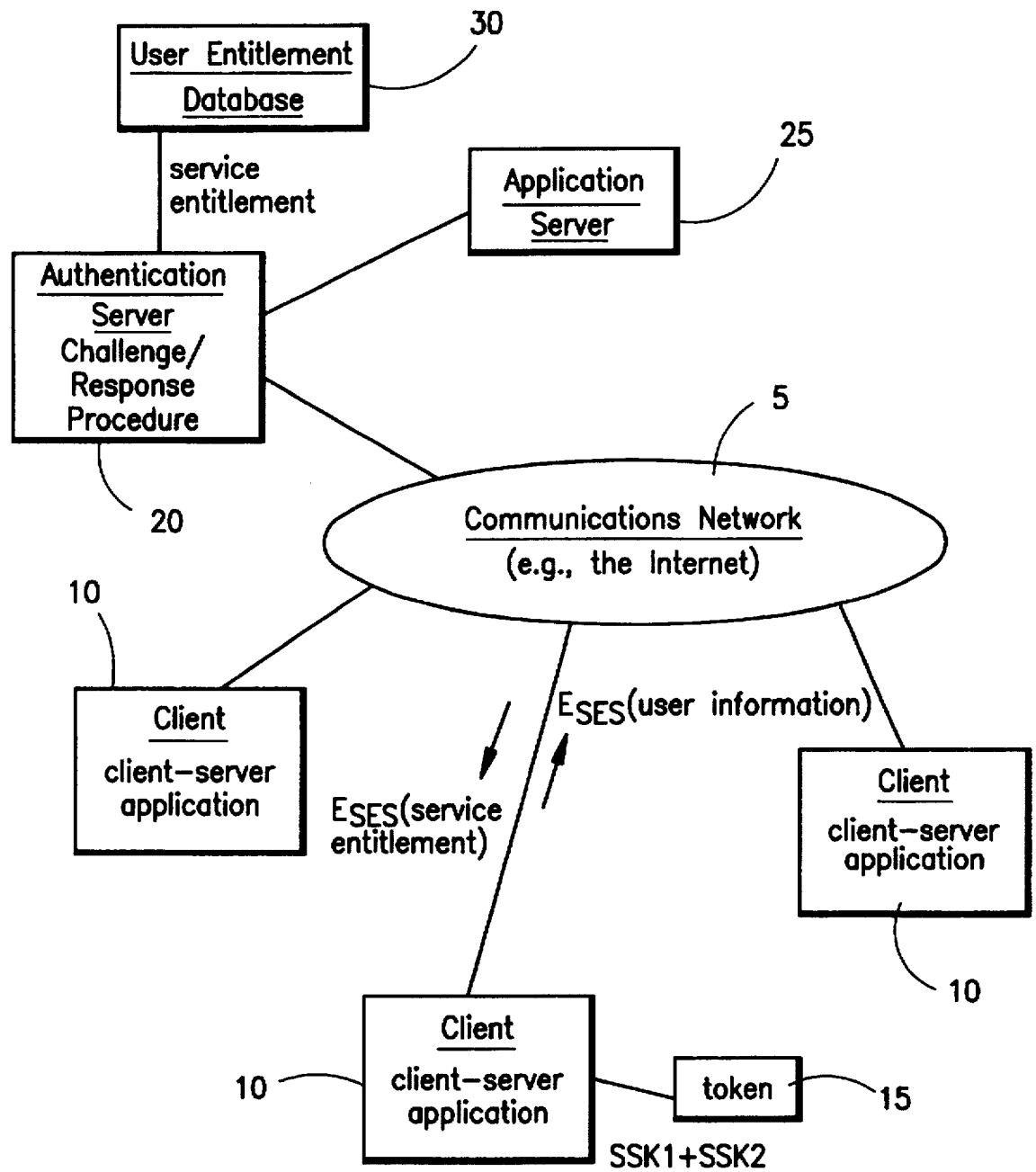
FIG. 2 is a functional block diagram of the preferred system showing aspects of a preferred procedure for dynamic configuration of user entitlements.
Figure 3A:
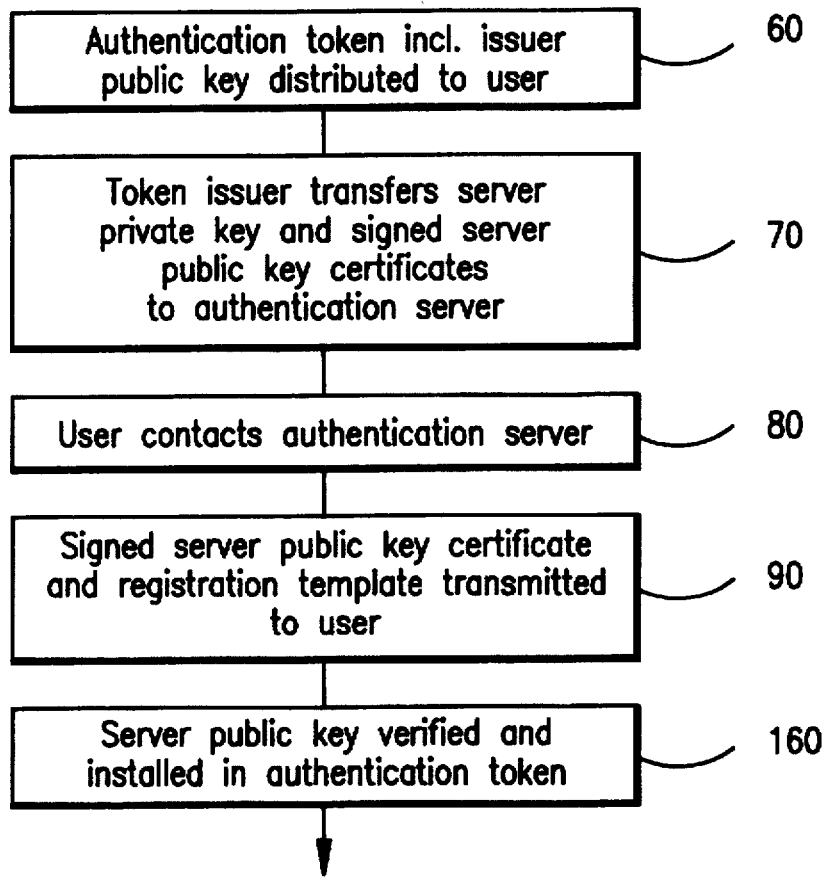
FIG. 3A is a flowchart showing a portion of the preferred registration, key distribution, and configuration procedure.
Figure 3B:
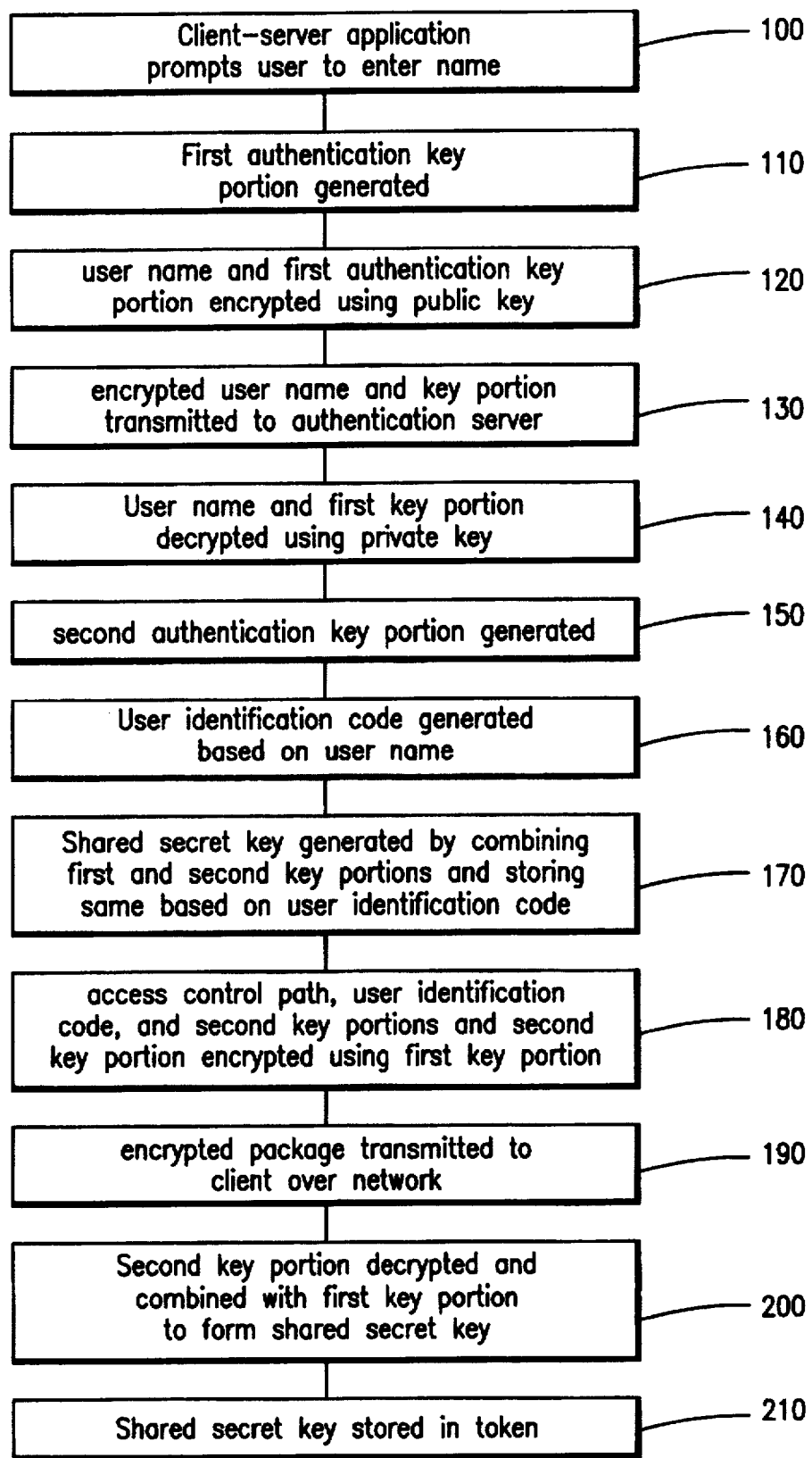
FIG. 3B is a continuation of the flowchart of FIG. 3A, showing further portions of the preferred registration, key distribution, and configuration procedure.

The preferred embodiment of the invention is practiced on a communications network 5 such as the Internet, made up of client nodes 10, each of which is connected to at least one computing device capable reading a "token." It will be appreciated that the tokens used by the present invention may take a variety of forms, and that the term "token" is intended to refer to any device capable of sending and receiving challenges and responses during a user authentication process, including but not limited to smartcards and PCMCIA cards, or software on a user's computer, and that the term "reader" is intended to refer to any device capable of transmitting data to and from a token. Numerous different types of tokens are currently available, and the invention is intended to be compatible with all such devices. It will also be appreciated by those skilled in the art that the invention is not limited to any particular browser or application software, but rather that the invention can be use with any applications supported by the server.

Also connected to the network 5 are at least one authorized authentication server 20 or "gateway" processor which in turn may be connected to one or more applications servers 25 offering services or products to clients on the network, as well as to a user entitlement database 30. Preferably, the operation of the authentication server 20 is transparent to the user, the authentication and key generation procedures being carried out during the initial establishment of communications with the user seeing only applications originating from the applications server.

Each authorized authentication server is assigned a private key and a corresponding public key by the token issuer or by a certification authority/key management agency 35. In addition, each token includes an embedded public key corresponding to a private key held only by the token issuer or certification authority, and not by the authentication server, and which allows the authentication token to verify the authenticity of the authentication server's public key.

The preferred procedure for implementing the invention thus begins with the distribution of a token having embedded therein a public key Pi of the token issuer or certification authority (step 60), and at some time before or after distribution of the token to the user, transfer to the server of the server's private key Pr and signed certificates containing the server's public key Pu (step 70). Once the user has installed the token, the user is prompted to place a call over the open network to a chosen authentication server (step 80) which in turn transmits a signed certificate and registration template to the client application for verification based on the embedded public key Pi (step 90). If the user cannot verify the authenticity of the certificate because the certificate was not signed using a private key corresponding to the embedded public key Pi, or because the embedded public key Pi does not correspond to the private key used to sign the certificate, then the communication is terminated.

Once the public key Pu is verified and installed on the token, the registration template is made available to the user for entry of information, including the user's name (step 100). The exact information requested will depend on the application, but potential applications include banking, financial trading, healthcare, publishing, insurance, telecommuting inter-departmental access, and a host of others.

Following initiation of registration, the client authentication and registration software generates a first portion SSK1 of an authentication key, which may for example include or be in the form of a random number (step 110). This first portion SSK1 of the authentication key is stored for later use and also combined with the user name and encrypted using the public key Pu (step 120), and then is transmitted to the authentication server (step 130). After receiving the encrypted first portion SSK1 of the authentication key and user name, the server recovers the user-generated portion of the authentication key using the private key (step 140) and generates a second portion SSK2 of the authentication key (step 150) and a user identification code based on the user name (step 160).

At this point, the server possesses both portions of the authentication key, which are then combined in any predetermined manner to form the final authentication key (step 170), and an access control path is combined with the user identification code and the second half of the authorization key and encrypted using the client generated first portion SSK1 of the authorization key (step 180). The encrypted package is transmitted over the open network to the client node (step 190), which decrypts the package using the stored first portion SSK1 of the authentication key to recover the second portion SSK2 of the authentication key (step 200) and combines the first and second portions of the authentication key using the same predetermined manner as used by the server to recreate the authentication key. Finally, the authentication key is encoded or stored in the authentication token for use as a shared secret key during subsequent communications (step 200).

It will be appreciated by those skilled in the art that the first and second portions of the authentication key may be generated in a variety of ways, and that the resulting authentication key may take a variety of forms, including a DES key. Also, the packages containing the respective key portions may include different types of information depending on the application, and may be combined with this information before encryption using a variety of combination techniques or algorithms, so long as the respective key portions are recoverable upon decryption. Finally, use of the authentication token is preferably further protected by a password or PIN number.

Figure 4:
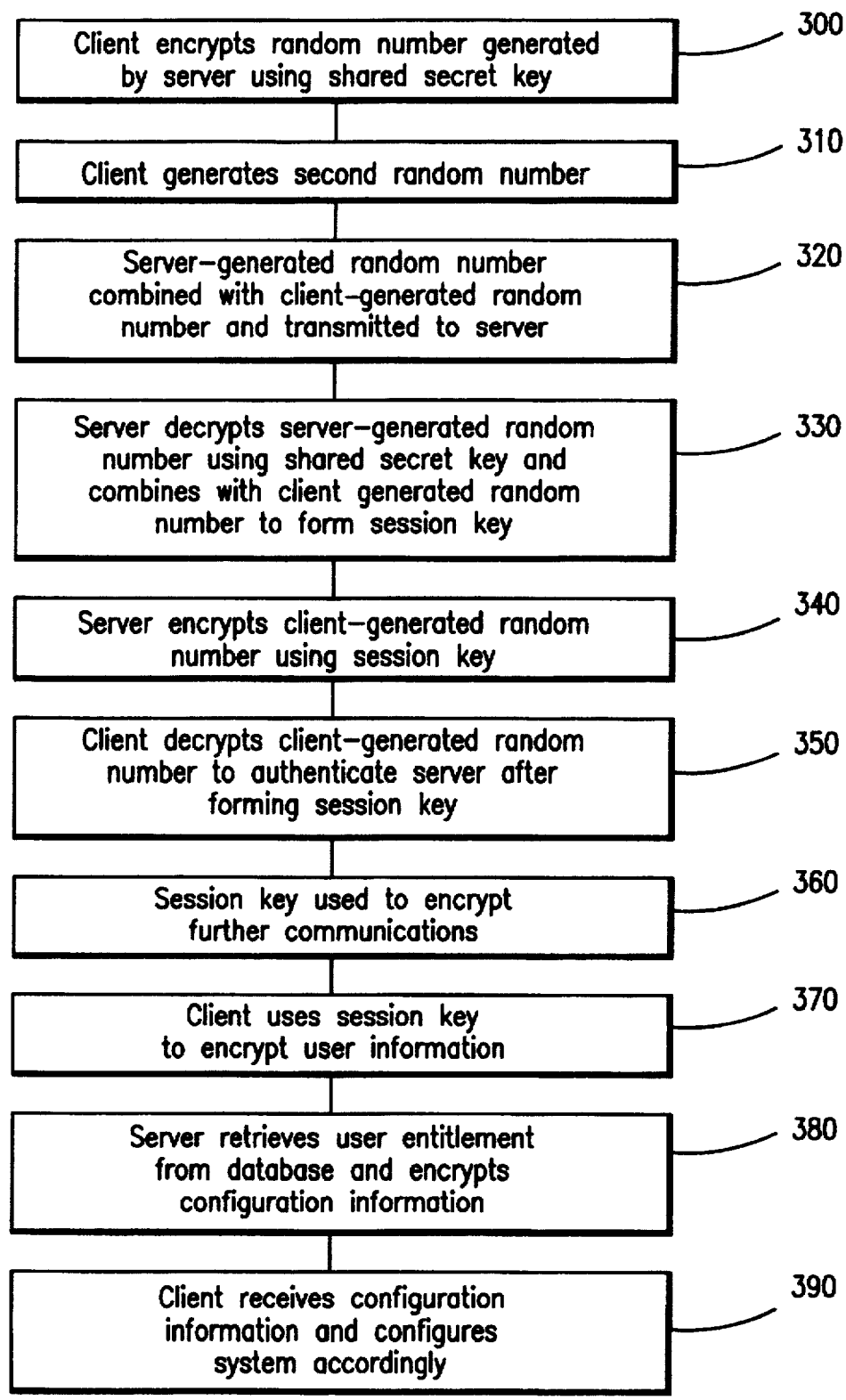
FIG. 4 is a flowchart summarizing the method of the firewall or gateway system with which the present invention may be used.

The resulting authentication key can then be used in the manner described in copending application Ser. No. 08/593, 240 to establish a session key SES based on the shared secret key or authentication key. Basically, as illustrated in FIG. 4, this involves having the holder of the authentication token on which the authentication or shared secret key is stored encrypt a first number generated by and received from the authentication server using the shared secret key (step 300), having the client generate a second number (step 310), combining the encrypted server number with the client-generated number for transmission back to the server using a one-way function such as the exclusive-OR function (step 320), causing the authentication server to retrieve the server-generated number by decrypting the package received from the client in order to authenticate the client and causing the server to generate a session key SES by combining the encrypted server-generated number with the received client-generated number again using a one-way function such as the exclusive-OR function (step 330). The authentication server then encrypts the client-generated number with the session key SES (step 340) and transmits the result to the client so that the client can verify that the server is authentic by generating a corresponding session key SES and decrypting the transmission from the server (step 350). Each party now possesses a session key SES that can be used to secure further communications without the involvement of a third party or the need to actually exchange keys over the open network.

Once a client has registered in the manner described above, the client system or token may need to be reconfigured to provide for different applications or different user entitlements, including use of the client software on different systems and/or at different locations. The present system permits such reconfiguration without the need for re-registration by providing for dynamic configuration of the client system following registration, to enable the user's software to take advantage of the access level permitted.

According to the present invention, this can be accomplished, as shown in FIG. 4, by using the shared secret key stored on the authentication token or developed during a registration session to encrypt additional user information and send the user information to server (step 370). After authentication of the user, the server uses the information to retrieve the user's service entitlement from an access control database (step 380), whereupon the necessary reconfiguration instructions can be encrypted and downloaded to reconfigure the client system (step 390).

Having thus described a preferred embodiment of the invention in sufficient detail to enable those skilled in the art to make and use the invention, it is nevertheless intended that the above description not be taken as limiting, but rather that the invention be defined solely by the appended claims.

We claim:

1. A method of registration and key distribution, comprising the steps of:
   a. providing an authentication token with a server public key of a server public key-private key cryptosystem;
   b. generating at least a portion of an authentication key;
   c. encrypting user identification information and said portion of the authentication key by using the server public key;
   d. transmitting the encrypted portion of the user identification information and the authentication key over an open network;
   e. decrypting the encrypted portion of the user identification information and the portion of the authentication key using the private key;
   f. using the user identification information to register the user and forming an authentication key based on the decrypted portion of the authentication key.

2. A method as claimed in claim 1, further comprising the steps, following step f, of encrypting a user identification code which is based on the user identification information together with a second portion of the authentication key and transmitting the encrypted user identification code and second portion of the authentication key using the first portion SSK1 of the authentication key, transmitting the encrypted user identification code and second portion of the authentication key back over the open network, decrypting the encrypted user identification code and second portion of the authentication key, and forming a second authentication key corresponding to the first authentication key for use as a shared secret key.

3. A method as claimed in claim 2, further comprising the steps of mutually authenticating parties to a communication and generating a session key using the shared secret key for use in encrypting subsequent communications during a session.

4. A method as claimed in claim 3, wherein the steps of mutually authenticating the parties and generating a session key comprise the steps of transmitting a number from one party to the other, encrypting the number using the shared secret key and generating a second number for transmission over the open network together with the encrypted first number, decrypting the first number to perform a first authentication, generating a session key by combining the encrypted first number with the second number using a one-way function and encrypting the second number using the session key, transmitting the encrypted second number over the open network, generating a second session key in the same manner as the first session key, and decrypting second number to perform a second authentication.

5. A method as claimed in claim 3, further comprising the steps of using the session key to encrypt user information, decrypting the session key encrypted user information and retrieving from a database user entitlements, encrypting configuration instructions based on the user entitlements using the session key, and transmitting the encrypted configuration instructions over the open network to dynamically configure the user's system based on the user entitlements.

6. A method as claimed in claim 1, wherein the step of providing the token with the server public key comprises the steps of generating a digitally signed certificate containing said server public key and transmitting it to the user at the initiation of registration.

7. A method as claimed in claim 6, further comprising the steps of embedding a token issuer public key in the authentication token and digitally signing the certificate prior to transmission of the server public key to the user so that the user can verify the authenticity of the server public key.

8. A method of distributing a shared secret key for use in a token authentication system, comprising the steps of:
   a. distributing to a user an authentication token and a server public key;
   b. causing a client computer to retrieve the server public key, generate a first portion of the shared secret key and store the first portion of the shared secret key;
   c. causing the client computer to encrypt the first portion of the shared secret key together with user identification information and transmit the encrypted first portion of the shared secret key and user identification information to a server;
   d. causing the server to recover the first portion of the shared secret key and user identification information;
   e. causing the server to generate a second portion of the shared secret key;
   f. causing the server to generate a user identification code based on the user identification information;
   g. causing the server to form the shared secret key by combining the first and second portions of the shared secret key;
   h. causing the server to encrypt the user identification code and the second portion of the shared secret key using the first portion of the shared secret key as an encryption key, and transmitting the encrypted user identification code and second portion of the shared secret key to the client computer;
   i. causing the client computer to recover identification code and the second portion of the shared secret key using the stored first portion of the shared secret key;
   j. causing the client computer to form the shared secret key by combining the first and second portions of the shared secret key.

9. A method as claimed in claim 8, further comprising the steps of mutually authenticating parties to a communication and generating a session key using the shared secret key for use in encrypting subsequent communications during a session.

10. A method as claimed in claim 9, wherein the steps of mutually authenticating the parties and generating a session key comprise the steps of transmitting a first number from the server to the client computer, causing the client computer to encrypt the first number using the shared secret key and generate a second number for transmission over the open network to the server together with the encrypted first number, causing the server to decrypt the first number to authenticate the client computer and generate a session key by combining the encrypted first number with the second number using a one-way function, causing the server to encrypt the second number using the session key and transmit the encrypted second number over the open network, causing the client computer to generate a second session key in the same manner as the first session key, and causing the client computer to decrypt the second number to thereby authenticate the server.

11. A method as claimed in claim 9, further comprising the steps of causing the client computer to use the session key to encrypt user information, causing the server to decrypt the session key encrypted user information and retrieve from a database user entitlements, causing the server to encrypt configuration instructions based on the user entitlements using the session key and transmit the encrypted configuration instructions over the open network to the client computer so as to dynamically configure the client computer based on the user entitlements.

12. A method as claimed in claim 8, wherein the step of distributing the server public key comprises the steps of generating a digitally signed certificate containing said server public key and transmitting it to the user at the initiation of registration.

13. A method as claimed in claim 12, further comprising the steps of embedding a token issuer public key in the authentication token and digitally signing the certificate prior to transmission of the server public key to the user so that the user can verify the authenticity of the server public key.

14. A system for registration and key distribution, comprising:
   a. means for distributing an authentication token to a user;
   b. means for distributing a server public key of a server public key-private key cryptosystem to the user;
   c. means for generating at least a portion of an authentication key;
   d. means for encrypting user identification information and said portion of the authentication key by using the server public key;
   e. means for transmitting the encrypted portion of the user identification information and the authentication key over an open network;
   f. means for decrypting the encrypted portion of the user identification information and the portion of the authentication key using the private key;
   g. means for using the user identification information to register the user and forming an authentication key based on the decrypted portion of the authentication key.

15. A system as claimed in claim 14, further comprising means for encrypting a user identification code which is based on the user identification information together with a second portion of the authentication key and transmitting the encrypted user identification code and second portion of the authentication key using the first portion SSK1 of the authentication key, means for transmitting the encrypted user identification code and second portion of the authentication key back over the open network, means for decrypting the encrypted user identification code and second portion of the authentication key, and means for forming a second authentication key corresponding to the first authentication key for use as a shared secret key.

16. A system as claimed in claim 15, further comprising means for mutually authenticating parties to a communication and generating a session key using the shared secret key for use in encrypting subsequent communications during a session.

17. A system as claimed in claim 16, wherein the steps of mutually authenticating the parties and generating a session key comprise the steps of transmitting a number from one party to the other, means for encrypting the number using the shared secret key and generating a second number for transmission over the open network together with the encrypted first number, means for decrypting the first number to perform a first authentication, means for generating a session key by combining the encrypted first number with the second number using a one-way function and encrypting the second number using the session key, means for transmitting the encrypted second number over the open network, means for generating a second session key in the same manner as the first session key, and means for decrypting second number to perform a second authentication.

18. A system as claimed in claim 16, further comprising means for using the session key to encrypt user information, means for decrypting the session key encrypted user information and retrieving from a database user entitlements, means for encrypting configuration instructions based on the user entitlements using the session key, and means for transmitting the encrypted configuration instructions over the open network to dynamically configure the user's system based on the user entitlements.

19. A system as claimed in claim 14, wherein the means for distributing the server public key to the user comprises means for generating a digitally signed certificate containing said server public key and transmitting it to the user at the initiation of registration.

20. A system as claimed in claim 19, further comprising the means for embedding a token issuer public key in the authentication token and digitally signing the certificate prior to transmission of the server public key to the user so that the user can verify the authenticity of the server public key.

21. A system of distributing a shared secret key for use in a token authentication system, comprising:

a. means for distributing to a user an authentication token;
b. means for distributing to the user a server public key;
c. means for causing a client computer to retrieve the server public key, generate a first portion of the shared secret key and store the first portion of the shared secret key;
d. means for causing the client computer to encrypt the first portion of the shared secret key together with user identification information and transmit the encrypted first portion of the shared secret key and user identification information to a server;
e. means for causing the server to recover the first portion of the shared secret key and user identification information;
f. means for causing the server to generate a second portion of the shared secret key;

g. means for causing the server to generate a user identification code based on the user identification information;
h. means for causing the server to form the shared secret key by combining the first and second portions of the shared secret key;
i. means for causing the server to encrypt the user identification code and the second portion of the shared secret key using the first portion of the shared secret key as an encryption key, and transmitting the encrypted user identification code and second portion of the shared secret key to the client computer;
j. means for causing the client computer to recover identification code and the second portion of the shared secret key using the stored first portion of the shared secret key;
k. means for causing the client computer to form the shared secret key by combining the first and second portions of the shared secret key.

22. A system as claimed in claim 21, further comprising means for mutually authenticating parties to a communication and generating a session key using the shared secret key for use in encrypting subsequent communications during a session.

23. A system as claimed in claim 22, wherein the means for mutually authenticating the parties and generating a session key comprise means for transmitting a first number from the server to the client computer, causing the client computer to encrypt the first number using the shared secret key and generate a second number for transmission over the open network to the server together with the encrypted first number, causing the server to decrypt the first number to authenticate the client computer and generate a session key by combining the encrypted first number with the second number using a one-way function, causing the server to encrypt the second number using the session key and transmit the encrypted second number over the open network, causing the client computer to generate a second session key in the same manner as the first session key, and causing the client computer to decrypt the second number to thereby authenticate the server.

24. A system as claimed in claim 22, further comprising means for causing the client computer to use the session key to encrypt user information, causing the server to decrypt the session key encrypted user information and retrieve from a database user entitlements, causing the server to encrypt configuration instructions based on the user entitlements using the session key and transmit the encrypted configuration instructions over the open network to the client computer so as to dynamically configure the client computer based on the user entitlements.

25. A system as claimed in claim 21, wherein the means for distributing the server public key to the user comprises means for generating a digitally signed certificate containing said server public key and transmitting it to the user at the initiation of registration.

26. A system as claimed in claim 25, further comprising the means for embedding a token issuer public key in the authentication token and digitally signing the certificate prior to transmission of the server public key to the user so that the user can verify the authenticity of the server public key.

* * * * *